US012803045B2

(12) United States Patent
Unnikrishnan et al.

(10) Patent No.: US 12,803,045 B2
(45) Date of Patent: Nov. 17, 2026

(54) HYBRID SOLID ELECTROLYTE AND BATTERY

(71) Applicant: LionVolt B.V., Eindhoven (NL)

(72) Inventors: Sandeep Unnikrishnan, Eindhoven (NL); Jelmer Jacob Visser, Eindhoven (NL); Bihag Anothumakkool, Eindhoven (NL)

(73) Assignee: LionVolt B.V., Eindhoven (NL)

( * ) Notice: Subject to any disclaimer, the term of this patent is extended or adjusted under 35 U.S.C. 154(b) by 444 days.

(21) Appl. No.: 18/697,332

(22) PCT Filed: Sep. 30, 2022

(86) PCT No.: PCT/NL2022/050545
§ 371 (c)(1),
(2) Date: Mar. 29, 2024

(87) PCT Pub. No.: WO2023/055234
PCT Pub. Date: Apr. 6, 2023

(65) Prior Publication Data

US 2025/0030042 A1 Jan. 23, 2025

(30) Foreign Application Priority Data

Oct. 1, 2021 (NL) ..................................... 2029308
Oct. 1, 2021 (NL) ..................................... 2029311

(51) Int. Cl.
*H01M 10/056* (2010.01)
*H01M 50/403* (2021.01)
(Continued)

(52) U.S. Cl.
CPC ....... *H01M 10/056* (2013.01); *H01M 50/403* (2021.01); *H01M 50/443* (2021.01);
(Continued)

(58) Field of Classification Search
None
See application file for complete search history.

(56) References Cited

U.S. PATENT DOCUMENTS

| | | | | |
|---|---|---|---|---|
| 2006/0008700 A1* | 1/2006 | Yong | H01M 10/052 429/251 |
| 2020/0112050 A1* | 4/2020 | Hu | H01M 10/056 |

FOREIGN PATENT DOCUMENTS

| | | |
|---|---|---|
| CN | 107665966 A | 2/2018 |
| CN | 108808077 A | 11/2018 |

(Continued)

OTHER PUBLICATIONS

International Search Report and Written Opinion for International Application No. PCT/NL2022/050545 mailed Jan. 23, 2023.

(Continued)

*Primary Examiner* — Wyatt P McConnell
(74) *Attorney, Agent, or Firm* — Dentons US LLP

(57) ABSTRACT

Aspects of the present disclosure relate to a metal ion battery, hybrid solid electrolyte (4) layer, and manufacturing methods The battery comprises an anode, a cathode and a hybrid solid electrolyte (4). The hybrid solid electrolyte comprises: a polymer matrix (5), a metal salt (6) and at least first and second dispersed filler materials. The first filler material comprises inorganic high-k dielectric particles (8). The second filler material comprises solid state electrolyte particles (9). A passivation layer (L2) at an anode side (4*a*) of the hybrid solid electrolyte (4) protects the fillers from the anode, facilitates the formation of a solid electrolyte interphase, and/or acts as a wetting or adhesion layer for an anode. A ceramic interlayer (L3) separates the passivation layer (L2) from the remainder of the hybrid solid electrolyte (4).

20 Claims, 6 Drawing Sheets

(51) Int. Cl.
*H01M 50/443* (2021.01)
*H01M 50/451* (2021.01)
*H01M 50/457* (2021.01)

(52) U.S. Cl.
CPC ....... *H01M 50/451* (2021.01); *H01M 50/457* (2021.01); *H01M 2300/0068* (2013.01); *H01M 2300/0082* (2013.01); *H01M 2300/0091* (2013.01); *H01M 2300/0094* (2013.01)

(56) References Cited

FOREIGN PATENT DOCUMENTS

| | | |
|---|---|---|
| CN | 111403804 | 7/2020 |
| WO | 2018183771 | 10/2018 |
| WO | 2019180845 | 9/2019 |
| WO | 2021034197 A1 | 2/2021 |

OTHER PUBLICATIONS

Chen, et al., "Highly Stable Quasi-Solid-State Lithium Metal Batteries: Reinforced Li1.3AI0.3Ti1.7(PO4)3/Li Interface by a Protection Interlayer." Adv. Energy Mater. vol. 11(30), 2101339, (2021).

Liang, et al., "Preparation and electrochemical characterization of ionic-conducting lithium lanthanum titanate oxide/polyacrylonitrile submicron composite fiber-based lithium-ion battery separators." Journal of Power Sources, 196(1), 436-441, (2011).

* cited by examiner

HYBRID SOLID ELECTROLYTE AND BATTERY

CROSS-REFERENCE TO RELATED APPLICATIONS

This application is a 371 National Stage application of International Application No. PCT/NL2022/050545, filed Sep. 30, 2022, which claims the benefit of priority from Netherlands Application Nos. 2029311 and 2029308, both filed Oct. 1, 2021, each of which is incorporated herein by reference in its entirety.

TECHNICAL FIELD AND BACKGROUND

The present disclosure relates to a battery, preferably a metal ion battery, comprising a hybrid solid electrolyte. In particular a hybrid solid electrolyte comprising at least first and second filler materials dispersed in the hybrid solid electrolyte. The disclosure further relates to methods of manufacturing the battery and to the hybrid solid electrolyte.

Metal-ion batteries, in particular lithium ion batteries, can potentially play a pivotal role in a global energy shift, for instance by the electrification of vehicles and storage of clean, renewable energy. Improvement of battery safety, capacity, and power density of lithium battery cells remains an actively pursued topic. Moving towards batteries having lithium metal anodes with a high capacity lithium metal can improve capacity. However the cycle life of lithium metal anodes is poor as a consequence of porosity and dendrite formation of lithium during battery charging in liquid electrolytes.

CN107665966A discloses modifying a, commercial polymer separator with coating types including a coating of 15-75% inorganic solids (e.g. BTO) in a polymer matrix on one side and a PVDF layer on the inorganic coating and on the other side of the separator. A lithium-sulfur battery is formed using the modified separator after gelation with a lithium salt DOL/DME liquid electrolyte. The disclosed battery fails to offer improved power density.

CN108808077A discloses a lithium metal battery comprising a gradient polymer separator immersed with lithium salt liquid electrolyte. The gradient polymer separator is formed by electrospinning multiple solutions with a PVDF-HFP copolymer and varying barium titanate concentrations to form a gradient polymer skeleton material. Similar as for CN107665966A the disclosed battery can be improved in terms power density.

Z. Chen et al disclose (Adv. Energy Mater. 2021, 11, 2101339) a flexible hybrid film consisting of a PVDF-TrFE polymer matrix carrying LATP particles and Li+-conductive ionic liquid that is incorporated into a Li metal cell. The Li anode is coated with a protective polymer layer of the organically synthesized poly[2,3-bis(2,2,6,6-tetramethylpiperidine-N-oxycarbonyl)-norbornene] (PTNB). Chen fails to address battery safety and similar to CN108808077A there remains room to improve power density.

Y. Liang (Journal of Power Sources, 196, 2011, 436) discloses ionic-conducting lithium lanthanum titanate oxide/polyacrylonitrile submicron composite fiber-based lithium-ion battery separators. The LLTO particles are shown to improve ionic conductivity, however there remains room for further improvement, also in terms of battery safety.

SUMMARY

The present disclosure aims to address one or more of the above limitations by providing a metal ion battery, a hybrid solid electrolyte, and a method of manufacturing the electrolyte and battery.

As will be explained in more detail herein below the presently disclosed hybrid solid electrolyte and battery offer increased capacity, power delivery rate, in particular for lithium metal anodes in combination with enhancing intrinsic safety and/or mechanical stability of the battery.

The metal ion battery as disclosed herein comprises at least an anode, a cathode and a hybrid solid electrolyte. The hybrid solid electrolyte is formed as a layer between the anode and the cathode. The hybrid solid electrolyte separates the anode and cathode, preventing electrical shorts, while maintaining appropriate ion conductivity.

The hybrid solid electrolyte is formed as a stack of layers comprising and comprises a diffusion layer and preferably one or more of a passivation layer and a ceramic interlayer at an anode side of the hybrid solid electrolyte.

The diffusion layer comprises a polymer matrix, a metal salt dispersed in the hybrid solid electrolyte, typically throughout the polymer matrix. In addition the hybrid solid electrolyte comprises electrically insulating inorganic filler particles. The inorganic filler particles include at least a first type comprising, or essentially consisting of, inorganic high-k dielectric particles, and a second type comprising, or essentially consisting of, solid state electrolyte particles.

The passivation layer can advantageously facilitate the formation of a solid electrolyte interphase (SEI), also sometimes referred to solid electrolyte interface. Advantageously the SEI can act a wetting or adhesion layer for the anode. Yet further advantageously the SEI can protect the electrically insulating inorganic filler particles from a direct contact with anode material, e.g. lithium metal.

Advantageously the electrically insulating inorganic filler particles can provide a pathway for ion transport. The second type of filler can essentially consist, of a metal ion conductive inorganic composition. Alternatively, or in addition, the second filler can comprise a mixture of materials, e.g. a solid carrier having a coating comprising a metal ion conductive inorganic composition.

The ceramic interlayer, when provided in combination with the passivation layer, extends between the passivation layer and the remainder of the hybrid solid electrolyte, e.g. between the passivation layer and the second layer of the hybrid solid electrolyte.

The first filler can comprise or essentially consist of an inorganic dielectric composition. The dielectric can be metal oxide or metalloid-oxide based, e.g. SiO2, TiO2, or combinations thereof. Preferably, the particles comprise, or essentially consist of a high-k dielectric, i.e. a material having a dielectric constant well in excess of about 4, at least over a temperature range of about 20° C. to about 100° C. Preferably, the dielectric constant is ≥20, more preferably ≥40. Most preferably the dielectric constant is in excess of 100. Suitable materials include but are not limited to metal titanates (MTiOx), including but not limited to barium-, strontium-, calcium-, copper-, and yttrium-based titanites as well as combinations and/or derivatives thereof, e.g. doped metal titanates. Preferred examples include barium titanate, strontium titanate, and combinations thereof. Incorporation of dielectric particles was found to advantageously improve homogenization of an electric field across the hybrid solid electrolyte layer, WO2021034197A1 discloses high dielectric electrode additives. Inventors believe incorporation of dielectric fillers can homogenize metal ion transport across the layers and/or mitigate dendrite formation at an interface with an anode material as a result of repetitive charging and discharging cycles. Inventors found that the higher the dielectric constant the better the homogenization can be. Preferably the particles are predominantly discrete particles with a homogeneous distribution within the hybrid solid electrolyte layer and/or in a sub-layer thereof. In addition to aligning the field the dielectric particles are found to advantageously reduce the softening and/or glass transition temperature of the polymer matrix, thus contributing to ion conductivity of the hybrid solid electrolyte. Inventors find that ion mobility increases with increased amounts of inorganic particles dispersed within the polymer matrix.

Providing a hybrid solid electrolyte that includes fillers as disclosed herein was found to offer a number of benefits. Filler particles can also reduce the viscosity of a composite melt, e.g. if a melt-extrusion or melt-casting approach is adopted for fabrication. In addition for field homogenization by the dielectric particles, these benefits include improvement of ion conductivity within the hybrid solid electrolyte layer. Alternatively, or in addition, the fillers can improve a mechanical stability of the electrolyte layer during its manufacturing, assembly, and/or during operation of a battery, e.g. during a condition wherein the matrix is in a gelled or semi-solid condition, e.g. as a result of an operation of the battery at or near a softening temperature of the matrix.

In particular inventors find that improved ion conductivity can be a result of one or more of: improved ion conduction along an external face of the filler (interfacial conduction or even conduction through the interphase); ion conduction along a pathway in the bulk of the ion conductive material comprised in the filler; and/or the contribution of the fillers to plasticization of the matrix, e.g. by reducing a softening or glass transition temperature of the matrix, thus indirectly improving ion conductivity of metal ions though portions of the matrix away from interfaces with the filler.

Improving ion conductance and mitigating field inhomogeneities advantageously enhances lithium deposition and/or plating uniformity during battery charging. Thus mitigating porosity and/or dendrite formation.

The fillers can be dispersed throughout the matrix as discrete elements. Advantageously, the fillers can be added in an amount above a percolation threshold, forming a percolation pathway for ion conduction between opposing faces of the polymer matrix. The pathway can be a pathway formed as a network comprising or plurality of adjacent or adjoining fillers, or a composite pathway wherein part of the percolation trajectory is formed by gaps between fillers across a volume of the matrix, e.g. matrix between adjacent fillers separated by a separation distance.

The hybrid solid electrolyte preferably has a passivation layer. The layer can advantageously shield the fillers and/or the polymer matrix from direct contact with one or more of the anode and an anolyte mitigating degradation of the fillers, e.g. by chemical interaction with the metal ion conductive inorganic composition. Advantageously, the passivation layer can be formed of a composition which facilitates the formation of a solid electrolyte interphase (SEI) and/or that acts as a wetting or adhesion layer for the anode.

The passivation layer L2 can be suitably comprised of a composition including a polymer matrix. The matrix can be the same or similar as the matrix comprising the fillers. Typically the polymer matrix comprises one or more materials selected from the group of polyvinylidene fluoride, polydimethylsiloxane, polyethylene oxide, polymethyl methacrylate, polyethylene diacrylate, polyacrylonitrile, hexafluoropropylene, and copolymers thereof. The average molecular weight (Mw) of the polymer materials is generally between 10000 and 1000000 g/mol. The thickness of the shielding layer is typically between 0.1 and 50 μm. Additives can include one or more of: a solid electrolyte interphase (SEI) forming composition and a plasticizer. SEI forming materials include but are not limited to: ionic liquids comprising a cation selected from of imidazolium, ammonium, pyrrolidinium, etc. and an anion selected from of bis(trifluoromethanesulfonyl)imide or bis(fluorosulfonyl) imide), e.g. N-Propyl-N-methylpyrrolidinium, and materials generally referred to as Glyme (e.g., Dimethoxyethane, Diethylene glycol diethyl ether) or Fluorine substituted Glyme (e.g., BTFE: Bis(2,2,2-trifluoroethyl)ether, fluorinated 1,6-dimethoxyhexane (FDMH). Optionally lithium salts can be included such as: lithium bis(trifluoromethanesulfonyl)imide, lithium bis(fluorosulfonyl)imide, lithium tetrafluoroborate, lithium dioxalate borate, lithium imide, lithium hexafluoroarsenate, lithium hexafluorophosphate, lithium nitrate or a combination thereof.

The passivation layer can further advantageously mitigate progressive surface roughening and/or deposition of porous anode material, due to repetitive metal-ion deposition (plating) and desorption (de-plating) during consecutive (dis) charging cycles of the battery It will be appreciated that the passivation layer can be a gel electrolyte, a hybrid solid/gel electrolyte, or even an essentially fully ceramic electrolyte layer such as LLZO or LiPON.

The inorganic interlayer (L3) may be provided between the passivation layer L2 and the remainder of hybrid solid electrolyte layer, e.g. between the passivation layer L2 and the second layer L1.2 of the hybrid solid electrolyte 4. The interlayer preferably forms an essentially closed coat along the passivation layer while. Typically the interlayer is a fully ceramic layer. The interlayer advantageously contributes to mitigating a direct contact between the anode and the solid state electrolyte filer comprised in the hybrid solid electrolyte 4. Similar to the shielding layer L0 the inorganic interlayer can be suitably formed of one or metal oxides, including but not limited to AlOx, BTO and NbOx. Similar to the shielding layer the interlayer will be configured with a thickness to allow anode metal ion transport, e.g. 2-4 nm.

In addition to improving the lifetime of the hybrid solid electrolyte filler comprised in the hybrid solid electrolyte 4 the interlayer was found to advantageously mitigate exchange of constituents e.g. polymer, solvent, additives between the passivation layer L2 and the remainder of the hybrid solid electrolyte layer (e.g. the second layer L1.2). Mitigating intermixing of the various layers was found to be of particular benefit during manufacturing.

In a preferred embodiment at least one or more of the inorganic high-k dielectric particles and the solid state electrolyte particles are elongate shaped. Preferably the elegant fillers have an with an aspect ratio >5, preferably at least 10. The higher the aspect ratio of the elongate fillers the smaller an amount requires to provide a path between opposing faces of the hybrid solid electrolyte layer can be. In a preferred embodiment at least one of the inorganic high-k dielectric particles and the solid state electrolyte particles are fibers or fibrous of nature. Advantageously the fibers can have an aspect ratio ≥50, preferably larger, e.g. ≥100, allowing to further minimize the amount required for forming a percolation pathway for ion conduction between opposing faces of the polymer matrix.

In some embodiments both of the inorganic high-k dielectric particles and the solid state electrolyte particles are elongate shaped, more preferably fibrous (FIG. 3A), thus allowing both materials to contribute to the formation of elongate ion conduction pathway. In addition presence of elongate, e.g. fibrous, fillers can improve a mechanical stability of the hybrid solid electrolyte.

As will be explained in more detail herein below, the elongate of fibrous fillers can advantageously improve ion conductance over non-fibrous fillers, e.g. particles. Advantageously the fibers can, at least in part, be oriented in a direction between opposing faces of the electrolyte layer for respectively contacting electrodes, e.g. with an anode and a cathode of an energy storage device. This improves ion conductance along a principal diffusion direction between anode and cathode. Further, orienting at least part of the second filler, fiber, in a direction between opposing electrodes, can provide the effects as to improved ion conductivity using a comparatively smaller volume fraction of the fillers within the electrolyte layer, as opposed to layers comprising randomly oriented fibers or fibers that are predominately oriented in a direction parallel between the anode/cathode. Minimizing the amount of fillers for a given conductance advantageously increases the volume per unit volume available for battery active ingredients such as metal ion species. A further advantage can be increased Li+ transference number.

Preferably, at least the solid state electrolyte fillers are elongate or fibrous. Elongate, or fibrous, solid state electrolyte fillers can further improve ion conductance trough a bulk of the elongate filler.

Generally the polymer matrix may contain a liquid carrier for the metal salt, e.g. a solvent or solvent mixture having an appropriate affinity for the salt and polymer matrix. Alternatively the salt may, at least in part, be provided in a liquid form such as an ionic liquid, preferably having melting point below an operating temperature of the battery, such as below 80 or 60° C. Inclusion of liquid carriers and/or liquid salts was found to advantageously improve ion mobility across the hybrid solid electrolyte layer. For similar reasons the hybrid solid electrolyte can optionally increase one or more plasticizers.

Inventors found that the above features may be particularly beneficial for batteries comprising a metal lithium anode, also referred to as lithium metal batteries. Accordingly, in preferred embodiments the battery is a lithium metal battery, whereby the metal salt comprises or essentially consists of an appropriate lithium salt. Examples include but are not limited to: LiTFSI (lithium bis(trifluoromethanesulfonyl)imide), LiFSI (lithium bis(fluorosulfonyl)imide), LiPF6 (lithium hexafluorophosphate), LiODFB (lithium difluoro(oxalate)borate), LiBOB (lithium bis(oxalato)borate), LiBF4 (lithium tetrafluoroborate), LiFOB (lithium difluoro(oxalato)borate), and mixtures thereof. In other or further preferred embodiments the battery comprises a metal anode, e.g. a lithium anode, such as a lithium metal film or strip. Lithium metal barriers advantageously offer a higher capacity of about 3800 mAh/g, well above a conventual, more limited, capacity of graphite anodes, which is typically below 370 mAh/g.

In a preferred embodiment, the metal ion conductive inorganic composition comprises or essentially consists of Lithium Aluminum Titanium Phosphate (LATP), Lithium Aluminum Germanium Phosphate (LAGP), Lithium Lanthanum Zirconium Oxide (LLZO), Halide electrolytes (e.g., $Li_{3-x}M_{1-x}Zr_xCl_6$ M=Y, Er), Sulphide electrolytes (e.g. $Li_{10}GeP_2S_{12}$, $Li_6PS_5X$ (X=Cl, Br or I), $67(75Li_2S\text{-}25P_2S_5)\text{-}33LiBH_4$, $30Li_2S\text{-}26B_2S_3\text{-}44LiI$), lithium hydroborates including but not limited to closo-borate ($B_nH_n^{2-}$), closo-carbaborate (having at least on B-atom substituted by Carbon, e.g. $LiCB_9H_{10}$), and/or derivatives and/or mixtures thereof. Alternatively, the solid state electrolyte fillers be essentially formed of a carrier, e.g. a glass fiber, comprising a coating of such composition.

Advantageously, in some embodiments the fibers can be physically inter-twined. This enhances inter-fiber conductivity. Optionally the fibers may be linked, e.g. fused, together forming a network of interlinked fibers, which removes inter-fiber diffusion barriers and further enhances inter-fiber diffusivity.

Generally the fibers have a length of at least 100 nm, e.g. in a range >500 nm. Longer fibers are possible, e.g. in excess of 5, 10 or even 100 μm. Fibers can even have a length up to several centimeters, e.g. up to 1 cm or more such as up to 10 cm. Fibers of specified length can be provided as disclosed herein, e.g. using methods such as electrospinning and extrusion.

Typically the fibers do not extend beyond the polymer matrix. Short fibers, fibers having a length less than a thickness of the polymer matrix, can be processed, intermixed, e.g. in melt, with the polymer matrix or precursor thereto. Longer fibers are typically incorporated in a preformed dry fiber structure, e.g. a mat, as will be explained herein. In some embodiments, elongate fillers are predominately (>50% by mass) oriented along a direction between the anode and the cathode. Preferably the fillers are predominately oriented along a principal direction between opposing faces of the polymer matrix. Preferably the deviation is between −20 and +20 degrees, most preferably between −10 and +10 degrees.

Generally the non-elongate and non-fibrous particles have a maximum dimension (diameter) below 1 μm, preferably smaller, e.g. below 0.5 μm. Typically, the particles have a maximum dimension in a range between 10 nm and 800 nm or in a range between 20 and about 500 nm. The smaller the particles the smaller the total amount required (volume per unit volume) for field homogenization and/or plasticizing the matrix. Non-fibrous, sub-micron particles can e.g. be obtained by spark ablation and/or by on wet-chemical synthesis methods.

In some embodiments, the nanoparticles are dispersed in the polymer matrix among the other constituents. This reduces a number of process steps required during manufacturing.

Alternatively or in addition at least part of the particles can be comprised in a separate layer. Accordingly, the diffusion layer is configured as a stack of layers including a first layer confining the solid state electrolyte fibers and a second layer, comprising at least part of the dielectric particles. The second layer, i.e. the layer without fibers preferably faces the anode. Providing the nanoparticles in a separate layer may advantageously decouple dispersing of the elongate fillers and the nanoparticles. Arranging the layer with particles closest to the anode can have the dual advantage of: aligning the electrical field directly where disturbances have the strangest effect, i.e. near the position where anode metal, e.g. Li, is plated, during battery operation plating; mitigating potential chemical degradation by avoiding direct mechanical contact between the anode material and the ion conductive fibers.

According to another or further aspect the present disclosure relates to the hybrid solid electrolyte layer as disclosed herein, e.g. comprising one or more of the features as described in relation to the battery. In some embodiments, the hybrid solid electrolyte comprises a stack of layers comprising: a diffusion layer comprising a polymer matrix, a metal salt dispersed in the polymer matrix and electrically insulating inorganic filler particles, wherein the inorganic filler particles comprise inorganic high-k dielectric particles and solid state electrolyte particles; and a passivation layer, at an anode side of the hybrid solid electrolyte, which facilitates the formation of a solid electrolyte interphase and acts as a wetting or adhesion layer for an anode.

According to other or yet further aspects the present disclosure relates to an electrochemical device comprising the hybrid solid electrolyte as disclosed herein.

Yet further aspects related to a method of manufacturing a metal ion battery and/or a hybrid solid electrolyte layer, preferably the metal ion battery and/or hybrid solid electrolyte as disclosed herein. In a broad sense the manufacturing the electrolyte comprises forming a diffusion layer and passivation layer at an anode side of the hybrid solid electrolyte. The diffusion layer comprising a polymer matrix, a metal salt dispersed in the polymer matrix and electrically insulating inorganic filler particles, the inorganic filler particles comprise inorganic high-k dielectric particles and solid state electrolyte particles.

Manufacturing the battery typically further comprises at least providing an anode and a cathode, whereby the hybrid solid electrolyte formed as a layer between the anode and the cathode. Advantageously, the hybrid solid electrolyte can be manufactured as an individual self-standing layer, e.g. by removing the hybrid solid electrolyte from a suitable carrier substrate. Alternatively the hybrid solid electrolyte can be manufactured onto an electrode layer. It will be appreciated that further layers such a catholyte and/or anolyte layer can be added as appropriate, either directly to the hybrid solid electrolyte, or as part of battery manufacturing.

In a preferred embodiment, providing the hybrid solid electrolyte comprises dispensing a pre-formed dispersion comprising the fillers and the polymer matrix and/or a precursor in an appropriate liquid carrier. Accordingly, providing the hybrid solid electrolyte comprises: dispensing, forming a dispensed layer comprising the fillers in a carrier further comprising the polymer matrix and/or a precursor thereto. Following dispensing, e.g. by printing, the polymer matrix is solidified. For example, by evaporating excess carrier and/or by curing/crosslinking the polymer matrix and/or the precursor thereto.

Dispensing may be performed by any known suitable method including but not limited to melt casting, solution casting, and/or melt extrusion. Advantageously extrusion may be solvent free extrusion. Forcing the composition through an aperture can advantageously result in an at least a partial alignment of elongate fillers. Solvent casting and C. Aitken-Nichol et al (Pharmaceutical Res., 13 804-808 (1996) provides an overview of hot melt extrusion methods.

Alternatively, or in addition, the method may comprise a step of aligning the elongate fillers, e.g. during or after dispensing the composition but before solidification. Inventors found that alignment can be suitably obtained by applying an external field along a direction of alignment, for example an electric field or magnetic field. Desired alignment can be attained by selecting appropriate field strength, duration, and/or direction, e.g. perpendicularly to the dispensed layer.

In a strongly preferred embodiment wherein providing the hybrid solid electrolyte comprises impregnating a preformed structure of the elongate fillers, preferably fibrous fillers. Accordingly, the step of wherein providing the hybrid solid electrolyte can be understood to comprise: generating a dry porous structure comprising of one or more of fibrous high-k dielectric particles and solid state electrolyte particles, and impregnating the dry porous structure with a composition comprising the polymer matrix and/or a precursor thereto, followed by solidifying polymer matrix and/or the precursor thereto. In this case of pre-forming a porous substrate, providing the hybrid solid electrolyte can comprise melt casting, melt-extrusion will be less preferred because of potentially damaging the fiber structure.

The fibers can be suitably formed as desired to a desired specification. Methods include ejection processes such as extrusion, e.g. melt extrusion, electrospinning, e.g. co-axial electrospinning, and coating of suitable carrier, e.g. fibers, etched structures, grown pillars. Electrospinning is preferred for forming structures comprising bulk continuous fibers.

If desired formed structures, e.g. coated fibers, can be cut, chopped up to shorter wires.

Preformed dry porous structure comprising fibers can be suitably provided using method comprising extrusion and/or electrospinning, e.g. of a metal ion conductive inorganic composition or mixture thereof onto a carrier substrate. A preferred predominant alignment can be obtained by electrospinning a solid state electrolyte composition from a deposition nozzle onto a carrier, whereby, during deposition, a lateral displacement rate of the nozzle relative to the carrier is smaller than a deposition rate of the fiber from the nozzle.

BRIEF DESCRIPTION OF DRAWINGS

These and other features, aspects, and advantages of the apparatus, systems and methods of the present disclosure will become better understood from the following description, appended claims, and accompanying drawing wherein:

These and other features, aspects, and advantages of the apparatus, systems and methods of the present disclosure will become better understood from the following description, appended claims, and accompanying drawing wherein:

DESCRIPTION OF EMBODIMENTS

Figure 1A:
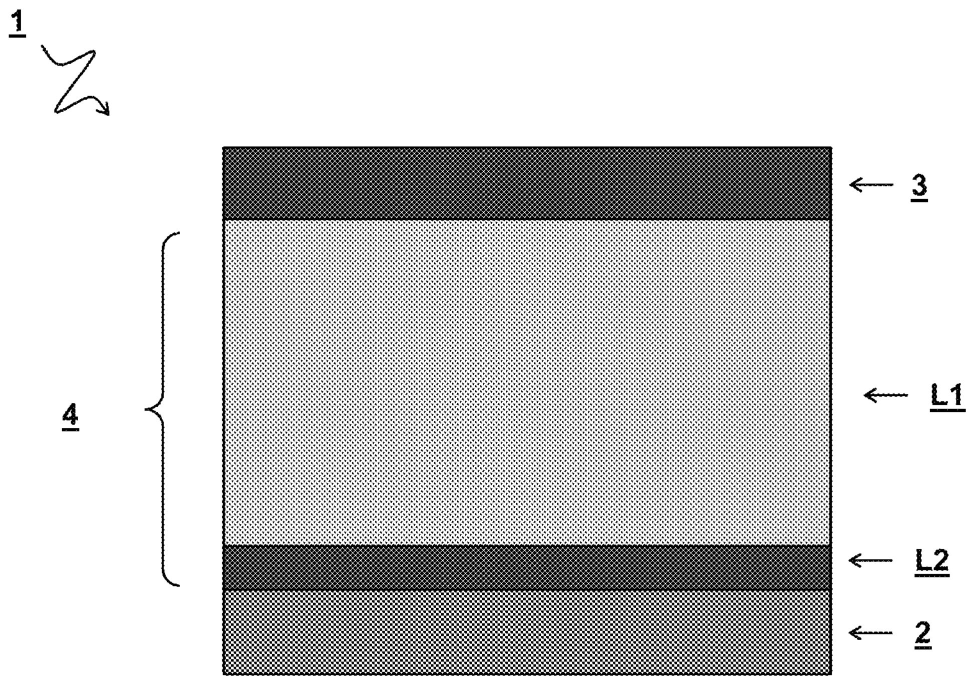
FIG. 1A provides a schematic cross-section side view of an embodiment of metal ion battery comprising a hybrid solid electrolyte, FIG. 1B provides a schematic cross section side view of a hybrid solid electrolyte.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A provides a schematic cross-section side view of an embodiment of metal ion battery 1 comprising a hybrid solid electrolyte 4. The hybrid solid electrolyte 4 is positioned between an anode 2 and a cathode 3. The hybrid solid electrolyte 4 separates forms a diffusion layer L1 for ion transport between the anode 2 and the cathode 3. The 4 also prevents direct electrical contact between the anode 2 and the cathode 3. The hybrid solid electrolyte 4 provides ion transport, from cathode towards anode during a charging cycle of the battery and vice versa during discharging.

Figure 6A:
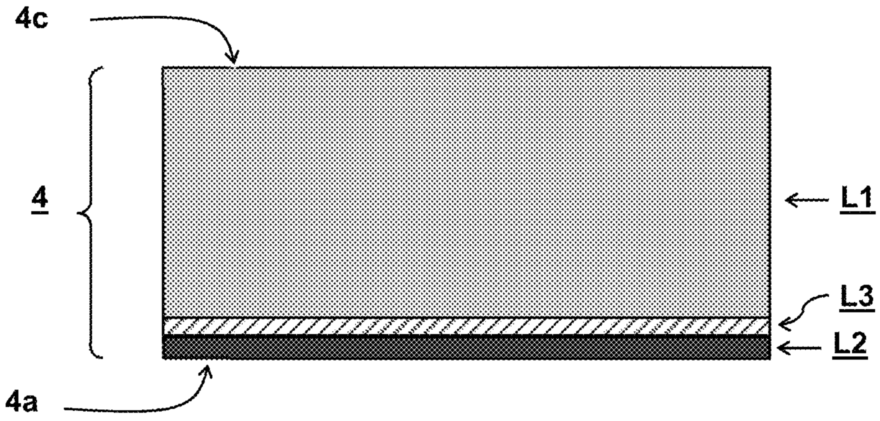

A passivation layer L2 is provided at an anode side of the hybrid solid electrolyte 4. The passivation layer L2 is provided along an anode side 4*a* of the hybrid solid electrolyte 4. The layer shields the hybrid solid the solid state electrolyte fibers from a direct contact with the anode 2 and/or an anolyte composition. In a preferred embodiment, e.g. as shown in FIG. 6A a ceramic interlayer L3 is provided. The ceramic interlayer extends between the passivation layer and the remainder of the hybrid solid electrolyte.

The interlayer forms an essentially continuous, closed, coat along the passivation layer while. Typically the interlayer is a fully ceramic layer. The interlayer advantageously contributes to mitigating a direct contact between the anode and the solid state electrolyte filer comprises in the hybrid solid electrolyte 4. Similar to the shielding layer L0, as discussed herein, the inorganic interlayer can be suitably formed of one or metal oxides, including but not limited to AlOx, BTO and NbOx. Similar to the shielding layer the interlayer will be configured with a thickness to allow anode metal ion transport, e.g. 2-4 nm.

This was found to prevent intermixing while retaining sufficient ion conductivity during use.

In addition to improving the lifetime of the hybrid solid electrolyte filler comprised in the hybrid solid electrolyte 4 the interlayer was found to advantageously mitigate exchange of constituents e.g. polymer, solvent, and/or, additives between the passivation layer L2 and the remainder of the hybrid solid electrolyte layer.

Advantageously, the passivation layer can be formed of a composition which facilitates the formation of a solid electrolyte interphase (SEI) and/or that acts as a wetting or adhesion layer for the anode.

The passivation layer L2 can be suitable comprised of a composition including a polymer matrix. The matrix can be the same or similar as the matrix comprising the fibers and/or particles. Typically the polymer matrix comprises one or more materials selected from the group of polyvinylidene fluoride, polydimethylsiloxane, polyethylene oxide, polymethyl methacrylate, polyethylene diacrylate, polyacrylonitrile, hexafluoropropylene, and copolymers thereof. The average molecular weight (Mw) of the polymer materials is generally between 10000 and 1000000 g/mol. The thickness of the shielding layer is typically between 0.1 and 50 μm. Additives can include one or more of: a solid electrolyte interphase (SEI) forming composition and a plasticizer. SEI forming materials include but are not limited to: ionic liquids, e.g. N-Propyl-N-methylpyrrolidinium. Optionally lithium salts can be included such as: lithium bis(trifluoromethanesulfonyl)imide, lithium bis(fluorosulfonyl)imide, lithium tetrafluoroborate, lithium dioxalate borate, lithium imide, lithium hexafluoroarsenate, lithium hexafluorophosphate, lithium nitrate or a combination thereof.

The passivation layer L2 can further advantageously mitigate progressive surface roughening and/or deposition of porous anode material, due to repetitive metal-ion deposition (plating) and desorption (de-plating) during consecutive (dis)charging cycles of the battery.

Figure 1B:
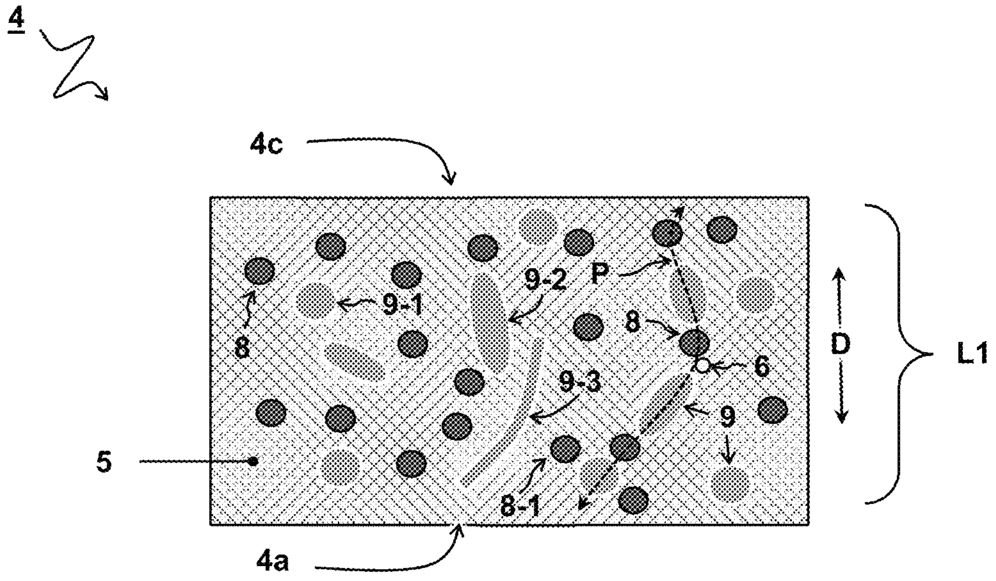

As illustrated in FIG. 1B the hybrid solid electrolyte 4 comprises a metal salt 6, dielectric particles 8, and solid state electrolyte particles 9, 9-1,9-2,9-4. These constituents are distributed, dispersed through the hybrid solid electrolyte 4 in a polymer matrix. The polymer matrix provides a network, schematically illustrated by cross-hatched pattern, which confines fillers while allowing the metal salt, ions, to diffuse between opposing faces 4*a*, 4*c* of the hybrid solid electrolyte 4. In the embodiment as shown the face marked 4*c* faces a cathode 3, whereas face 4*a* faces an anode of 1 battery device.

In a preferred embodiment, at least of the dielectric particles 8, and solid state electrolyte particles 9 is in an elongate from 9-2. In some embodiments the dielectric particles 8 are in elongate form, e.g. fibers. Preferably, at least part of the solid state electrolyte particles 9 is in an elongate form 9-2, or as fibers 9-3, e.g. as shown.

It will be appreciated that the hybrid solid electrolyte 4 can comprise further additives (not shown for clarity) including, but not limited to, an amount of liquid carriers such as ionic liquid and/or organic solvents, and plasticizer in the polymer matrix. In some embodiments, small amounts, e.g. up to 5 vol % each, of ionic liquid or organic solvents or other additives, such as a plasticizer like succinonitrile, may be added into the Polymer Matrix.

Likewise it will be understood that the battery and/or hybrid solid electrolyte 4 can comprises further one or more further constituents such as anolyte, catholyte, and a passivation layer, as will be explained in more detail in relation to FIGS. 3B and 4A.

In some embodiments, any of the filler particles, e.g. the dielectric particles 8 filler and/or the solid state electrolyte fibers 9 can be provided with a coating comprising a metal ion conductive inorganic composition, e.g. an organic coating, such as an organic monolayer, providing functional end groups capable of reversible associating to metal cations, e.g. capable forming an electric double layer. For example, end groups such as-carboxyl groups, hydroxyls, phosphates and the like.

As will be explained in more detail below with reference to FIGS. 1B and 2A the dielectric particles 8 and the solid state electrolyte particles 9 serve to increase ion mobility thought the polymer matrix 5. In embodiments wherein at least one of the dielectric particles 8 and the solid state electrolyte particles 9 is in elongate, preferably fibrous form the solid and elongate nature if the fibers 9 additionally improves mechanical integrity of the hybrid solid electrolyte 4, in particular when the matrix is in a semi-solid, e.g. gel-like, condition during battery operation. For example, example as a result of an elevated temperature of the electrolyte during operation (e.g. about 40-80° C.), and/or due reduction of a plasticization temperature or glass transition temperature due to addition of the dielectric particles 8 and solid state electrolyte fibers 9 and/or the other constituents.

Figure 2A:
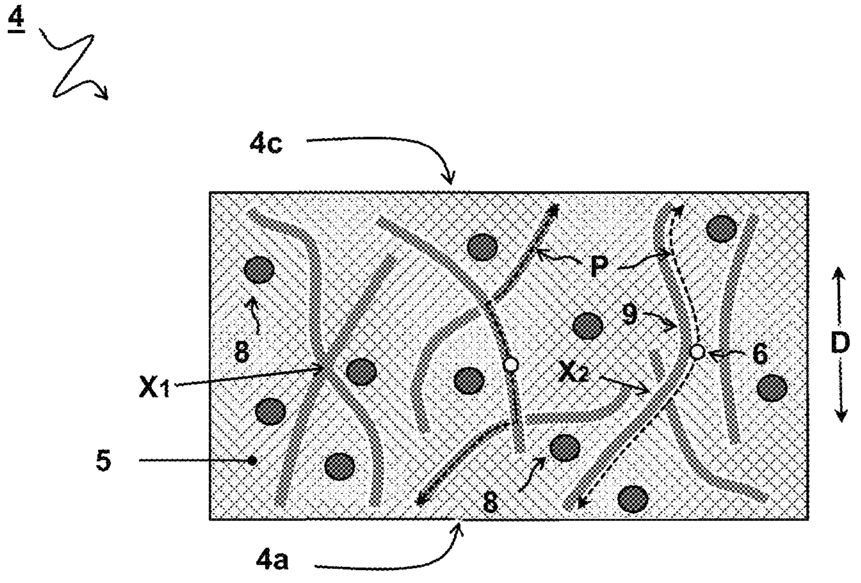
FIGS. 2A, 2B, and 3A depict schematic cross section side views of hybrid solid electrolytes.

In some embodiments, e.g. as shown in FIG. 2A of the dielectric particles 8 and the solid state electrolyte particles 9 are in fibrous form.

In a preferred embodiment, e.g. as shown, the elongate fillers 8,9 are predominantly orientated along a principal direction D between the anode 2 and the cathode 3. As such the fibers provide mechanical support along a direction between the anode 2 and cathode 3, while also improving ion transport in the principal direction D between opposing faces 4*a*, 4*c* of the hybrid solid electrolyte 4.

Preferably, the solid state electrolyte and/or high-k dielectric fillers are provided in an amount above a percolation threshold. This allows forming a network for ion transport throughout the polymer matrix 5. As shown by the dashed arrow ion 6 transport can advantageously take place along and outer surface of the fillers and/or elongate fillers. Alternatively, or in addition, ion transport can take place along the dielectric particles 8, within the bulk of the solid state electrolyte fibers 9, or via a combination thereof.

In some embodiments, at least part of the elongate fillers or fibers are chemically interconnected, e.g. fused as indicated by the crossing fibers marked X1. Fusing can be obtained for example by annealing of a preformed fiber structure or by hot processing of the wires, e.g. during electrospinning as will be explained in relation to FIG. 5B. In other or further embodiments, the, fat least part of the fibers are intertwined, e.g. as shown in the crossing marked X2.

The dielectric particles 8 homogenize an electric field along a direction between the anode 2 and the cathode 3 during battery operation (marked direction D). In some embodiments, e.g. as shown, the dielectric particles 8 are distributed, dispersed, throughout the polymer matrix 5. In other or further embodiments, e.g. as shown in FIG. 2B, the dielectric particles can be distributed along a layer L1.2 along one of the terminal faces of the hybrid solid electrolyte 4.

Figure 3A:
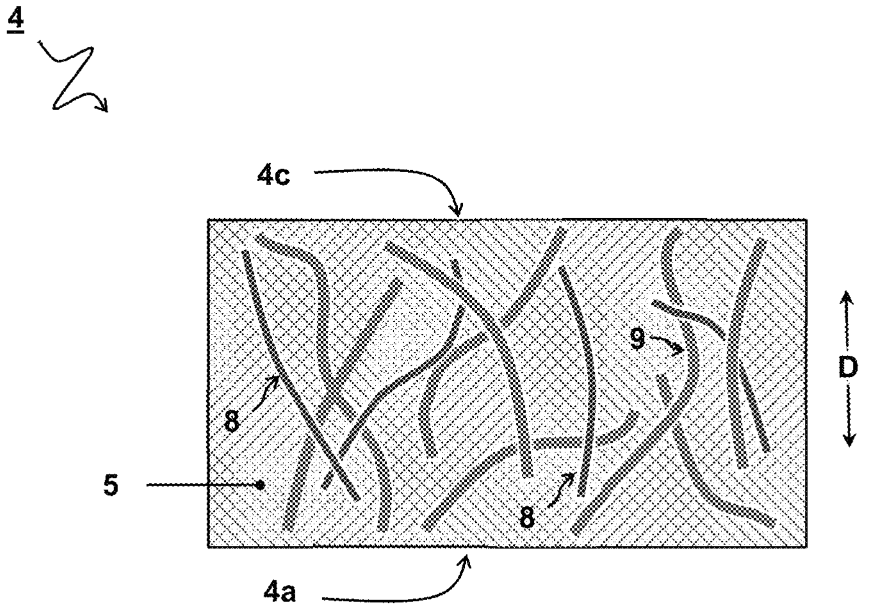

In some embodiments, e.g. as shown in FIGS. 1B, 2A, and 3A, the dielectric particles 8 and the solid state electrolyte particles 9 are intermixed in a single layer L1. Intermixing the dielectric particles 8 and the solid state electrolyte fibers 9 in a single layer can reduce a number of process steps for manufacturing the hybrid solid electrolyte 4 as opposed to a multilayer configuration.

Figure 2B:
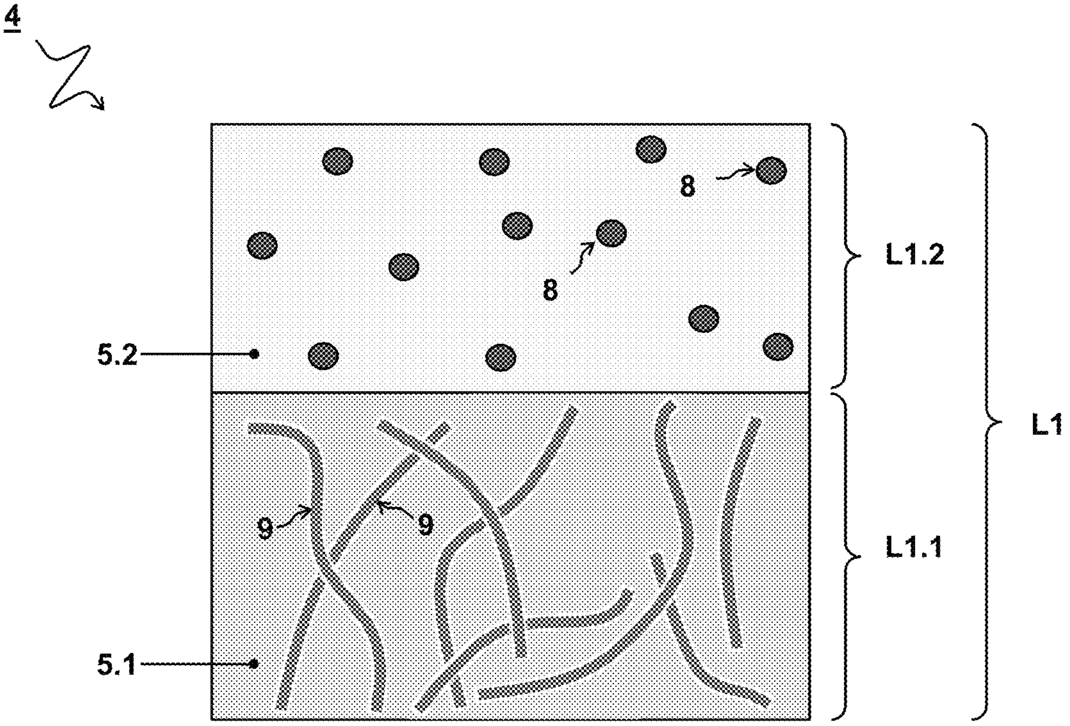
Figure 3B:
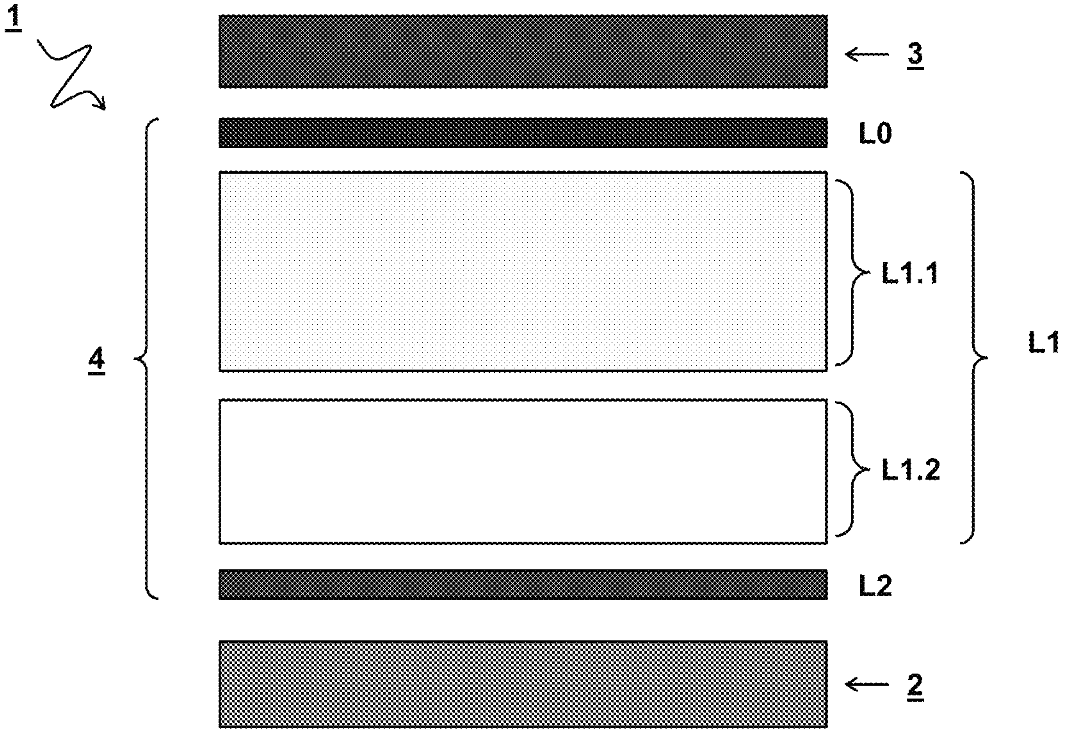
FIG. 3B provides a schematic exploded cross-section side view of a metal ion battery.

In other or further embodiments, e.g. as shown in FIGS. 2B and 3B, the dielectric particles 8 and the solid state electrolyte particles 9 are provided in separate layers L1.1, L1.2, whereby the particles and fibers are each dispersed throughout a polymer matrix 5.1,5.2 along with a metal salt 6. The salt and matrix material are typically similar or even of the same composition. Using the same, or at least of the same class, mitigates a diffusion barrier between the interfaced between the layers L1.1, L1.2. When the hybrid solid electrolyte 4 is configured as a stack the layer comprising the dielectric particles 8, e.g. layer 1.2, is preferably oriented towards the anode 2, e.g. as shown in FIG. 3A.

In a preferred embodiment, e.g. as shown in FIGS. 1B, 2A, 2B, and 3A, the fibers 8,9 do not extend to or beyond the opposing faces 4*a*, 4*c* of the hybrid solid electrolyte 4. This mitigates potential (electro) chemical interaction between the fiber and the electrode materials, in particular lithium. Such configuration can for example be obtained by provision of one or more interlayers without fibers such as a shielding layer L0 and a passivation layer L2.

Alternatively, or in addition, the hybrid solid electrolyte can comprise a fibrous dielectric, preferably a fibrous high-k dielectric. In generally, advantageous aspects as to improved mechanical stability and ion conductance along an interphase between fibers and the dielectric matrix can be obtained with inorganic dielectric fibers, even when the solid state electrolyte in an a particulate, e.g. non-fibrous form such as nanoparticles. In view of the contribution of the solid state electrolyte to ion conduction fibrous solid state electrolytes as disclosed herein are preferred.

In general terms the hybrid solid electrolyte can be understood to comprise: a polymer matrix, a metal salt dispersed in the hybrid solid electrolyte, typically throughout the polymer matrix. In addition the hybrid solid electrolyte comprises at least first and second dispersed filler materials. The first filler material comprises an inorganic high-k dielectric. The second filler material comprises solid state electrolyte, wherein at least one of the first and second material is at least in part in a fibrous form.

In some embodiments, at least part of the other of the first and second filler is also in a fibrous form. The different fibers can be intermixed, e.g. homogenously distributed, e.g. in a preformed dry fiber structure. Alternatively the fibers can be intermixed, e.g. during melt or solution processing. Dry structures of intermixed fibers with different composition can be suitably made by co-spinning or co-extruding of corresponding materials.

Figure 6B:
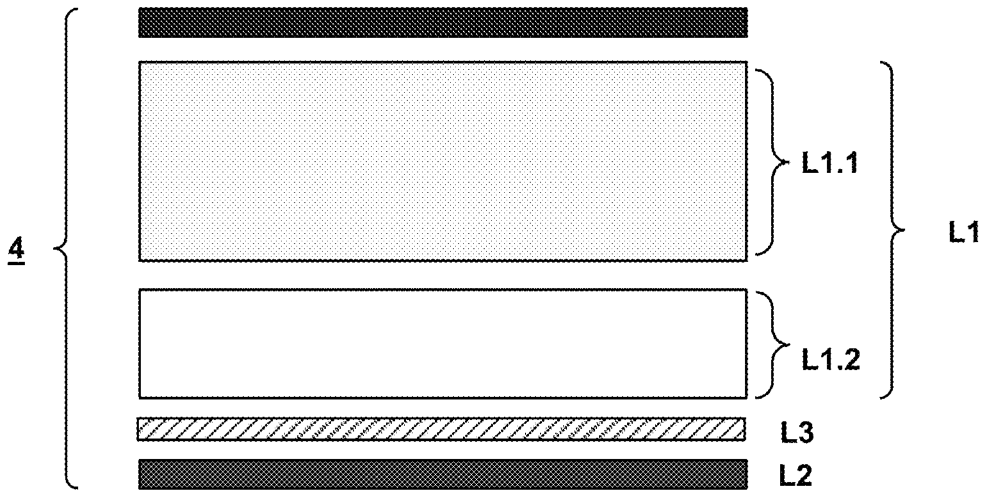

Similar as discussed in relation to FIG. 1A and FIG. 6A a ceramic interlayer L3 can provided. FIG. 6B illustrates an embodiment wherein the diffusion layer is configured as a stack including a first layer L1.1 confining the solid state electrolyte particles 9 and a second layer L1.2, comprising at least part of the dielectric particles 8, whereby the second layer L1.2 faces the anode 2, whereby the embodiment further comprises the ceramic interlayer that extends between the passivation layer (L2) and the remainder of the hybrid solid electrolyte 4. As shown, the ceramic interlayer L3 can extend between the passivation layer and the second layer L1.2 of the hybrid solid electrolyte 4.

In other or further preferred embodiments, the hybrid solid electrolyte comprises a capping layer. The capping layer can advantageously shield the fillers from direct contact with one or more of the anode, the cathode, anolyte, and a catholyte, mitigating degradation of the fillers, e.g. by chemical interaction with the metal ion conductive inorganic composition.

Figure 4A:
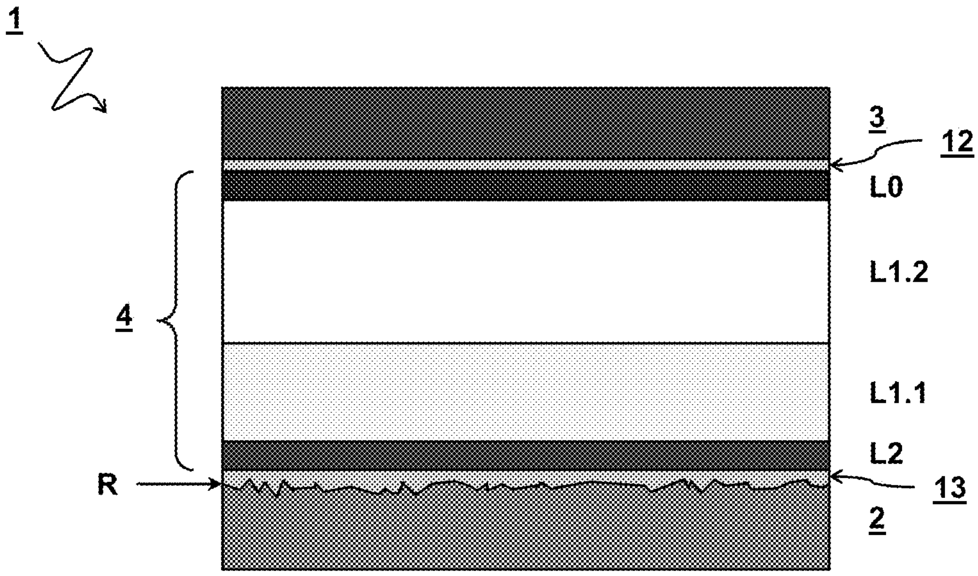
FIG. 4A provides a schematic cross-section side view of a metal ion battery.

In other or further embodiments, e.g. as shown in FIGS. 3B and 4A, the hybrid solid electrolyte comprises both a passivation layer L2 and one or more shielding layer L0 at a cathode side 4*c* of the hybrid solid electrolyte 4.

In the embodiment as shown in FIG. 3B the metal ion battery 1 comprises a hybrid solid electrolyte 4 that is configured as a stack of layers L1. The stack includes a first layer L1.1 comprising the fibers and a second layer L1.2 that comprises the dielectric particles 8, as shown in FIG. 2B. Similar to the embodiment shown in FIG. 1A a passivation layer L2 is provided that faces the anode 2. In addition a shielding layer L0 is provided along at an cathode side of the hybrid solid electrolyte. The passivation layer L0 can comprise similar, or even the same, constituents as the shielding layer and can have a thickness in the same range, e.g. about 500 nm, about 2 μm, or about 10 μm. The combination of the shielding and passivation layers was found to optimally protect the ion conductance improving fillers from degradation.

Alternatively, or in addition, the shielding may be comprised of, or essentially consist of, an inorganic composition, e.g. metal oxides such as ceramics. It will be appreciated that the thickness of the shielding layer will be such as to allow anode metal ion transport across the layer. For materials with limited anode metal conductivity the thickness may be suitably determined by routine experimentation, e.g. down to a few nanometers, e.g. 2-10 nm or 3-4 nm. non-anode-ion. For example, the shielding layer may comprise or be essentially formed of one or more Transition-metal dichalcogenide (TMD) layers, such as $MoS_2$. Transition-metal dichalcogenide were found to effectively block direct contact between cathode and the additives, especially the solid state electrolyte additives while enabling anode metal ion transport FIG. 4A provides a schematic cross-section side view of a metal ion battery 1. In comparison to the embodiments shown in FIG. 3A the first layer L1.1 and the second layer L1.2 are arranged in preferred orientation whereby the layer comprising the dielectric particles, i.e. layer L1.2, faces the anode 2.

In addition the battery includes an anolyte 12 and catholyte 13. The catholyte and the anolyte are positioned at interfaces between the hybrid solid electrolyte 4 and respectively the cathode 3 and the anode 2. The catholyte and anolyte improve contact between the hybrid solid electrolyte 4 and the electrode materials, in particular when the anode/cathode are formed of solid materials, e.g. metal films or foils, have surface undulations or roughness R that does not match a surface profile of the opposing face of the hybrid solid electrolyte 4. If the cathode and/or the anode is a porous layer, then the catholyte and/or the anolyte will also be penetrate into the porosity, e.g. be present inside the bulk of the electrodes. Their function is not only to improve the interfacial contact with the hybrid solid electrolyte membrane, but also to enable an ion-conduction path within the bulk of the electrode layers.

Figure 4B:
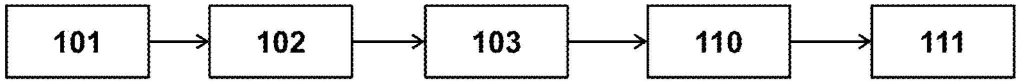
FIG. 4B schematically illustrates a method manufacturing a metal ion battery.
Figure 4C:
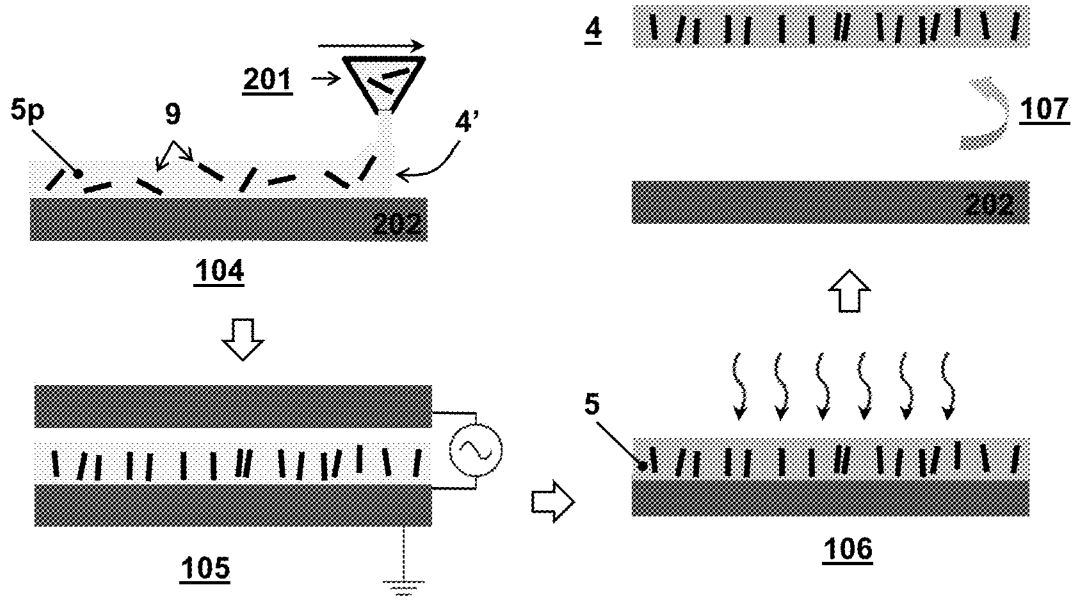
FIGS. 4C, 5A, and 5B, schematically illustrate certain aspects of methods of manufacturing a hybrid solid electrolyte layer, and FIGS. 6A and 6B provide schematic cross-section side views of metal ion batteries.
Figure 5A:
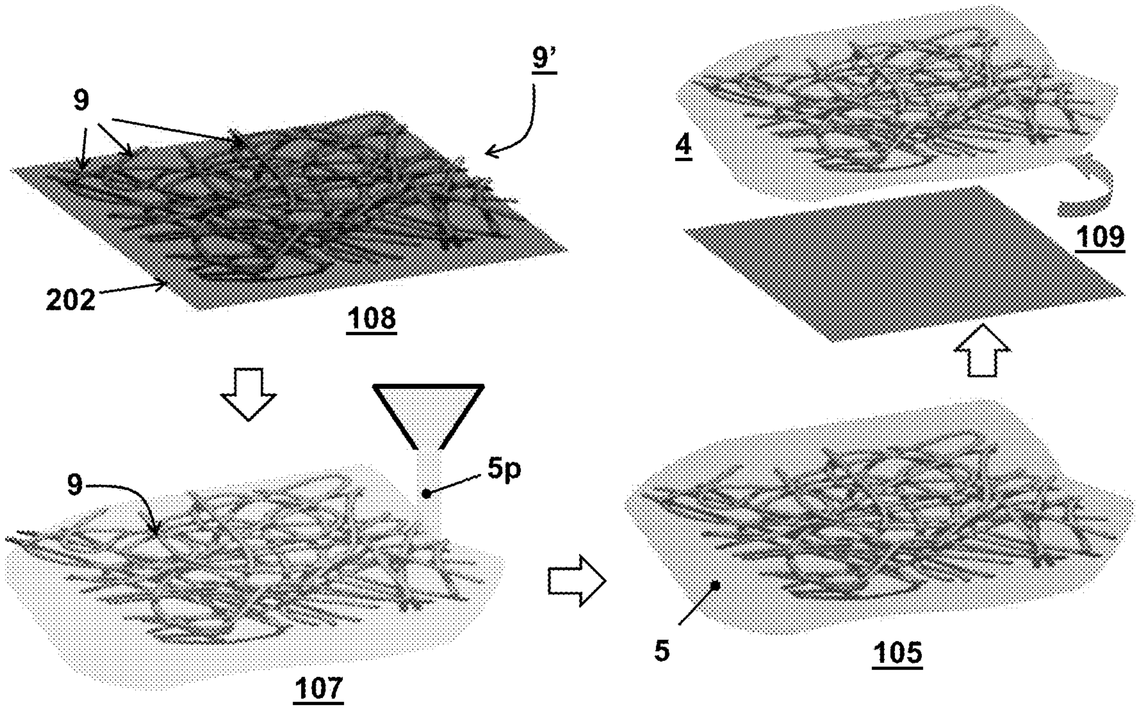
Figure 5B:
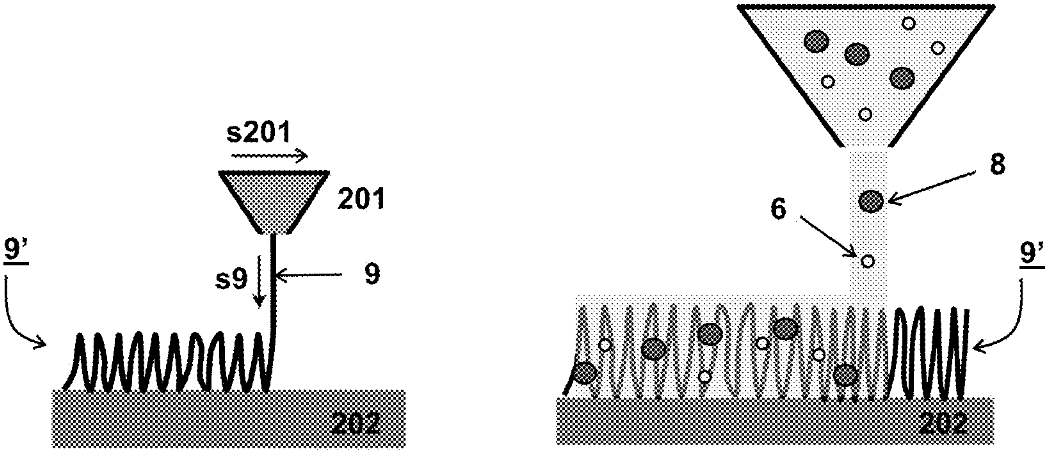

Aspects concerning manufacturing the hybrid solid electrolyte 4 and metal ion battery 1 will now be explained in more detail with reference to FIGS. 4B, 4C, 5A, and B, wherein FIG. 4B schematically illustrates a method manufacturing a metal ion battery; and FIGS. 4C, 5A, and 5B schematically illustrate certain aspects of methods of manufacturing a hybrid solid electrolyte layer.

As illustrated in FIG. 4B, the method of manufacturing a metal ion battery comprises: providing an anode 101, providing a cathode 102 and providing a hybrid solid electrolyte 103. Optionally the method can include the steps of providing and anolyte 110 and/or providing a catholyte 111, whereby the provided constituents are suitably arranged in a battery configuration as disclosed herein. It will be appreciated that the steps need not necessarily be performed in the depicted order. The constituents may be assembled or even build upon each other in any suitable order. In particular the step of providing the electrolyte may be performed independently resulting in preformed hybrid solid electrolyte 4 layers of films which can be stored, used, or sold independently, e.g. as part of another electrochemical device. The step of providing 103 the hybrid solid electrolyte 4 generally comprises forming a diffusion layer and providing a shielding layer, wherein providing 103 the hybrid solid electrolyte 4 comprises forming a layer stack comprising: a diffusion layer L1 comprising a polymer matrix 5, a metal salt 6 dispersed in the polymer matrix 5 and electrically insulating inorganic filler particles, and a passivation layer L2, at an anode side of the hybrid solid electrolyte 4, which facilitates the formation of a solid electrolyte interphase SEI and acts as a wetting or adhesion layer for the anode 2, wherein the inorganic filler particles comprise inorganic high-k dielectric particles 8 and solid state electrolyte particles 9.

FIG. 4C depicts exemplary aspects of forming the hybrid solid electrolyte 4. The top-left illustrates a nozzle 201 during depositing 104 a layer 4'. The layer comprises solid state electrolyte particles 9 and a polymer matrix or precursor thereto 5*p*. The process as shown depicts a composition, a slurry, including short fibrous solid state electrolyte particles 9. For nanoparticles a similar process can be used. For long fibers, i.e. fibers having a length in excess of a target electrolyte thickness the process generally includes preforming a dry fibrous structure, as explained with reference to FIGS. 5*a* and 5B.

Bask to FIG. 4C, the layer is deposited onto a carrier substrate 202 from which the hybrid solid electrolyte 4 can be delaminated as a membrane after forming. Alternatively the hybrid solid electrolyte 4 can be assembled directly onto a functional battery layer, e.g. an anode or cathode. During deposition the composition is in a liquid, e.g. molten of solubilized state.

In another or further preferred embodiment, the composition is a slurry be mixed into the slurry comprising the polymer and/or precursor thereto along with the solid state electrolyte particles 9 and dielectric particles, e.g. BTO particles.

Following deposition layer is hardened 106 to form the polymer matrix 5, e.g. by evaporating excess solvent and or curing of the polymer and precursor thereto. The bottom left drawing depicts the process during UV curing (wavy arrows) of the layer.

In some embodiments, e.g. as shown in the bottom right drawing, the hardening step is preceded by aligning 105 the elongate filler particles, e.g. short solid state electrolyte fibers 9. In the embodiment as shown alignment is performed by applying an electromagnetic field in a perpendicular direction across the layer. This field aligns the elongate particles, e.g. fibers, in the still liquid, uncured, layer 4'. The length of the fibers can be adapted to a target thickness of the hybrid solid electrolyte layer, e.g. by shortening, e.g. cutting or chopping, longer preformed fibers.

After hardening the procedure may include delaminating 109 the hardened layer from the carrier 202 to yield a free standing hybrid solid electrolyte 4.

The metal salt 6 (not depicted in the drawings) and/or other constituents can be included in the mixture or slurry as deposited. Alternatively the metal salt 6 and any one or more of the other constituents, e.g. plasticizer, can be added at a later stage, e.g. after hardening, by exposing the polymer matrix to a solution with salt/additives in a solvent with affinity to the polymer, e.g. swelling the polymer matrix.

In some embodiments providing 103 the hybrid solid electrolyte 4 comprises: generating, pre-forming, a dry porous structure comprising solid state fibrous filler. The preformed structure of fibers can subsequently be impregnated with a composition comprising the polymer matrix and/or a precursor thereto, followed by solidifying polymer matrix and/or the precursor thereto. As discussed above the salt and/or or additives can be added along with the precursor compositor or introduced afterwards, e.g. in a swelling step.

In some embodiments, the structure of the fibers can comprise intrinsically porous fibers. In some embodiments, the structure of the fibers can comprise intrinsically porous fibers. Intrinsic porosity can be made, for example, within the electrospun fibers by e.g. trapping small gas bubbles or mixing solvents in the precursor that after spinning & annealing of the fibers result in voids. Provision of pores/voids advantageously increases surface area of the fibers while reducing a net weight of the fiber. In other or further embodiments, the structure of the fibers can be a co-axially layered structure of the fibers. In other or further embodiments, the structure of the fibers can be a co-axially layered structure of the fibers.

Advantageously, the fibers may be post-treated for surface modifications or coatings, before mixing in with the polymer matrix. (e.g. for better interaction with the matrix).

FIG. 5A (top left) depicts procedure following a step 108 of preforming a dry porous structure 9' comprising solid state electrolyte fibers 9. As shown the structure can be formed on a carrier substrate 202. Subsequently the formed structure, either on the carrier or on a battery active layer, is impregnated 107 with a composition with a composition comprising the polymer matrix and/or a precursor thereto 5*p*. After impregnation the polymer matrix and/or the precursor thereto is hardened, e.g. by curing and/or evaporation of excess solvent yielding a polymer matrix 5 with embedded solid state electrolyte fibers 9 (5A, bottom right). Following the hardening the formed hybrid solid electrolyte 4 can be delaminated 109 from carrier.

FIG. 5B schematically illustrates how electrospinning can be used to yield a preformed structure 9' of solid state electrolyte fibers 9 on face of a substrate, e.g. a carrier 202. Alternatively the spun fibers can be cut to smaller pieces, collected, and used in a melt or solution process as described in relation to FIG. 5A. Thus a structure 9' or mat can be formed which can be collected separately or which can be used directly in an impregnation process as described in relation to FIG. 5A or 5C. For dry mats structural integrity can be improved by interconnecting deposited fibers and/or portions of deposited fibers, e.g. by intertwining or chemical interconnections such as fused portions.

In a preferred embodiment, the dry porous structure 9' is formed in a process comprising electrospinning a precursor to the high-k dielectric and/or solid state electrolyte fibers from a deposition nozzle 201 onto a carrier 202, whereby a lateral displacement rate of the nozzle s201 relative to the carrier 202 is smaller than an ejection rate of spun fiber s9 from the nozzle. By deposition the spun fiber at a higher rate than a lateral displacement rate of the nozzle, preferably at least 10 times higher, the deposited fiber forms vertical loops away from the substrate whereby the height of the loops increases with increasing difference between spin and translation rates.

Additionally, the electrospinning can have the benefit of forming chemically interconnected crossings between fibers and/or fiber portions, for example, when during deposition deposited spun fiber is kept close over slightly above a softening or fusing temperature.

It will be understood that the fibers and/or the dry structure as described herein may be manufactured using alternate ejecting processes, such as spinning processes or extrusion processes, including but not limited to pressure driven spinning or extrusion processes. For example, in one embodiment the process may be a gas pressure-based blow spinning process or a mechanical spinning process. As a further example the fibers may be formed by slot-die extrusion.

As a yet further alternative process for manufacturing the hybrid solid electrolyte (4) the method may comprise the steps providing an appropriately dimensioned contained and filling the container with one or more of the first and the second filler. After the container is filled with the first and/or second filler the remaining components of the hybrid solid electrolyte can be added using injection and/or deposition methods as disclosed herein. The matrix can for example be formed by injecting a softened polymer composition, solution, or polymer precursor composition. The salt may be added along with the matrix or in a separated step, e.g. by injection an appropriate solution. Volatile solvents can be removed using methods known in the field.

Alignment of the fillers, e.g. the elongate or fibrous second fillers, may be realized by mechanical stimulation of the field container, e.g. shaking, causing fillers to reorient towards more energetically favorable more aligned packing.

Dry preformed porous structures comprising elongate particles can alternatively be manufactured from a metal foam, e.g. aluminum, which is oxidized, to form a high-k dielectric structure. Alternatively, or in addition, a dielectric or solid state electrolyte coating may be provided to the formed porous structures, e.g. by vapor deposition methods such as PVD and ALD. Formed high-k dielectric structures can subsequently be impregnated, e.g. with a slurry, with remaining constituents of the hybrid solid electrolyte. Alternatively, or in addition, formed structures, e.g. foam-based structures, can be crushed or chopped up to provide short elongate particles which can be used a part of a composition for melt od solution processing.

For the purpose of clarity and a concise description, features are described herein as part of the same or separate embodiments, however, it will be appreciated that the scope of the invention may include embodiments having combinations of all or some of the features described. For example, while embodiments were shown for hybrid solid electrolyte with intermixed dielectric particles and solid state electrolyte fibers, also alternative ways may be envisaged by those skilled in the art having the benefit of the present disclosure for achieving a similar function and result. E.g. the fibers and particles may be combined or split up into one or more layers. The various elements of the embodiments as discussed and shown offer certain advantages, such as improved ion conductance, mechanical integrity, and electrolyte stability. Of course, it is to be appreciated that any one of the above embodiments or processes may be combined with one or more other embodiments or processes to provide even further improvements in finding and matching designs and advantages. It is appreciated that this disclosure offers particular advantages to rechargeable lithium batteries and in particular lithium metal batteries, and in general can be applied for any application, e.g. electrode with electrolyte, benefitting from improved ion conductance.

For the purpose of clarity and a concise description, features are described herein as part of the same or separate embodiments, however, it will be appreciated that the scope of the invention may include embodiments having combinations of all or some of the features described. For example, while embodiments were shown for hybrid solid electrolyte with intermixed dielectric particles and solid state electrolyte fibers, also alternative ways may be envisaged by those skilled in the art having the benefit of the present disclosure for achieving a similar function and result. E.g. the dielectric and solid state electrolyte fillers may be combined or split up into one or more layers. The various elements of the embodiments as discussed and shown offer certain advantages, such as improved ion conductance, mechanical integrity, and electrolyte stability. Of course, it is to be appreciated that any one of the above embodiments or processes may be combined with one or more other embodiments or processes to provide even further improvements in finding and matching designs and advantages. It is appreciated that this disclosure offers particular advantages to rechargeable lithium batteries and in particular lithium metal batteries, and in general can be applied for any application, e.g. electrode with electrolyte, benefitting from improved ion conductance.

In an embodiment the present application provides a metal ion battery 1 comprising an anode 2, a cathode 3 and a hybrid solid electrolyte 4, between the anode 2 and the cathode 3, wherein the hybrid solid electrolyte 4 is formed as a stack of layers comprising: a diffusion layer L1 comprising a polymer matrix 5, a metal salt 6 dispersed in the polymer matrix 5 and electrically insulating inorganic filler particles, and a passivation layer L2, at an anode side of the hybrid solid electrolyte 4, which facilitates the formation of a solid electrolyte interphase SEI and acts as a wetting or adhesion layer for the anode 2, wherein the inorganic filler particles comprise inorganic high-k dielectric particles 8 and solid state electrolyte particles 9.

In one embodiment, the metal ion battery 1 comprises a shielding layer L0, at a cathode side of the hybrid solid electrolyte 4, to shield the inorganic filler particles and/or the polymer matrix from the cathode and/or a catholyte composition 12.

In another or further embodiment, at least one or more of the inorganic high-k dielectric particles 8 and the solid state electrolyte particles 9 are elongate shaped with an aspect ratio >5.

Preferably, at least one or more of the inorganic high-k dielectric particles 8 and the solid state electrolyte particles 9, preferably at least the high-k dielectric particles are fibrous.

Preferably, the elongate shaped inorganic high-k dielectric particles 8 and/or the solid state electrolyte particles 9 are predominately oriented along a principal direction between the anode 2 and the cathode 3.

In some embodiments, the inorganic filler particles form a percolation pathway P for ion conduction between opposing faces 4*a*, 4*c* of the polymer matrix 5.

Preferably, high-k dielectric particles 8 have a dielectric constant ≥100.

In some embodiments, the diffusion layer can advantageously be configured as a stack including a first layer L1.1 confining the solid state electrolyte particles 9 and a second layer L1.2, comprising at least part of the dielectric particles 8, whereby the second layer L1.2 faces the anode 2.

In other or further embodiments, one or more of the inorganic filler particles comprise a coating comprising a metal ion conductive functional end group.

In other or further embodiments, the solid state electrolyte particles 9, comprise one or more lithium ion conductive composition.

According to a further aspect there is provided a hybrid solid electrolyte as described herein. The hybrid solid electrolyte can be formed as a stack of layers comprising: a diffusion layer L1 comprising a polymer matrix 5, a metal salt 6 dispersed in the polymer matrix 5 and electrically insulating inorganic filler particles, and a passivation layer L2, at an anode side of the hybrid solid electrolyte 4, which facilitates the formation of a solid electrolyte interphase SEI and acts as a wetting or adhesion layer for an anode 2, wherein the inorganic filler particles comprise inorganic high-k dielectric particles 8 and solid state electrolyte particles 9.

In one embodiment, the hybrid solid electrolyte further comprises a shielding layer L0, at a cathode side of the hybrid solid electrolyte 4, to shield the inorganic filler particles and/or the polymer matrix from the cathode and/or a catholyte composition 12.

According to a further aspect there is provided a method of manufacturing a metal ion battery comprising: providing an anode, a cathode and a hybrid solid electrolyte between the anode and the cathode, wherein providing 103 the hybrid solid electrolyte 4 comprises forming a layer stack comprising: a diffusion layer L1 comprising a polymer matrix 5, a metal salt 6 dispersed in the polymer matrix 5 and electrically insulating inorganic filler particles, and a passivation layer L2, at an anode side of the hybrid solid electrolyte 4, which facilitates the formation of a solid electrolyte interphase SEI and acts as a wetting or adhesion layer for the anode 2, wherein the inorganic filler particles comprise inorganic high-k dielectric particles 8 and solid state electrolyte particles 9.

In one embodiment, the method comprises impregnating the hybrid solid electrolyte 4 with a liquid composition comprising a metal salt 6.

In another or further embodiment, the solid state electrolyte particles 9 and/or the high-k dielectric particles 8 are provided in an amount above a percolation threshold.

At least one or more of the inorganic high-k dielectric particles (8) and the solid state electrolyte particles (9) can be formed by electrospinning a corresponding precursor composition thereto.

In some embodiments, providing 103 the hybrid solid electrolyte 4 comprises: dispensing 104, forming a dispensed layer comprising the solid state electrolyte particles 9 in a carrier further comprising the polymer matrix 5 and/or a precursor 5*p* thereto, followed by solidifying 105 the polymer matrix 5 and/or the precursor thereto.

In some preferred embodiments, the method comprises aligning 106 the solid state electrolyte fibers 9 in an electromagnetic field, said field being oriented perpendicularly to the dispensed layer.

In some embodiments, the dispensed layer further comprises the dielectric particles 8.

The dispensing can comprises melt-casting and/or melt extrusion.

In other or further preferred embodiments, providing 103 the hybrid solid electrolyte 4 can comprises generating a dry porous structure comprising fibers of one or more of the inorganic high-k dielectric particles 8 and the solid state electrolyte particles 9, and impregnating the dry porous structure with a composition comprising the polymer matrix and/or a precursor thereto, followed by solidifying polymer matrix and/or the precursor thereto.

The dry porous structure can be formed in a process comprising electrospinning a precursor to the solid state electrolyte particles and/or the high-k dielectric particles from a deposition nozzle onto a carrier, whereby a lateral displacement rate of the nozzle relative to the carrier is smaller than a deposition rate of the fiber from the nozzle.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A metal ion battery (1) comprising an anode (2), a cathode (3) and a hybrid solid electrolyte (4), between the anode (2) and the cathode (3), wherein the hybrid solid electrolyte (4) is formed as a stack of layers comprising:

a diffusion layer (L1) comprising a polymer matrix (5), a metal salt (6) dispersed in the polymer matrix (5) and electrically insulating inorganic filler particles, a passivation layer (L2), at an anode side of the hybrid solid electrolyte (4), which facilitates the formation of a solid electrolyte interphase (SEI) and acts as a wetting or adhesion layer for the anode (2), and a ceramic interlayer (L3) forming an essentially closed coat between the passivation layer (L2) and the remainder of the hybrid solid electrolyte (4), wherein the inorganic filler particles comprise inorganic high-k dielectric particles (8) and solid state electrolyte particles (9).

2. The metal ion battery (1) according to claim 1, further comprising a shielding layer (L0), at a cathode side of the hybrid solid electrolyte (4), to shield the inorganic filler particles and/or the polymer matrix from the cathode and/or a catholyte composition (12).

3. The metal ion battery (1) according to claim 1, wherein a) at least one or more of the inorganic high-k dielectric particles (8) and the solid state electrolyte particles (9) are elongate shaped with an aspect ratio >5; or b) at least one or more of the inorganic high-k dielectric particles (8) and the solid state electrolyte particles (9), are fibrous.

4. The metal ion battery (1) according to claim 3, wherein the elongate shaped inorganic high-k dielectric particles (8) and/or the solid state electrolyte particles (9) are predominately oriented along a principal direction between the anode (2) and the cathode (3).

5. The metal ion battery (1) according to claim 1, wherein the inorganic filler particles form a percolation pathway (P) for ion conduction between opposing faces (4*a*,4*c*) of the polymer matrix (5).

6. The metal ion battery (1) according to claim 1, wherein the high-k dielectric particles (8) have a dielectric constant ≥100.

7. The metal ion battery (1) according to claim 1, wherein the diffusion layer is configured as a stack including a first layer (L1.1) confining the solid state electrolyte particles (9) and a second layer (L1.2), comprising at least part of the dielectric particles (8), whereby the second layer (L1.2) faces the anode (2).

8. The metal ion battery (1) according to claim 1, wherein one or more of the inorganic filler particles comprise a coating comprising a metal ion conductive functional end group.

9. The metal ion battery (1) according to claim 1, wherein the solid state electrolyte particles (9), comprise a lithium ion conductive composition or a combination thereof.

10. A hybrid solid electrolyte, formed as a stack of layers comprising:

a diffusion layer (L1) comprising a polymer matrix (5), a metal salt (6) dispersed in the polymer matrix (5) and electrically insulating inorganic filler particles, and a passivation layer (L2), at an anode side of the hybrid solid electrolyte (4), which facilitates the formation of a solid electrolyte interphase (SEI) and acts as a wetting or adhesion layer for an anode (2), and a ceramic interlayer (L3) forming an essentially closed coat between the passivation layer (L2) and the remainder of the hybrid solid electrolyte (4), wherein the inorganic filler particles comprise inorganic high-k dielectric particles (8) and solid state electrolyte particles (9).

11. A hybrid solid electrolyte according to claim 10, further comprising a shielding layer (L0), at a cathode side of the hybrid solid electrolyte (4), to shield the inorganic filler particles and/or the polymer matrix from the cathode and/or a catholyte composition (12).

12. A method of manufacturing a metal ion battery comprising: providing an anode, a cathode and a hybrid solid electrolyte between the anode and the cathode, wherein providing (103) the hybrid solid electrolyte (4) comprises forming a layer stack comprising:

a diffusion layer (L1) comprising a polymer matrix (5), a metal salt (6) dispersed in the polymer matrix (5) and electrically insulating inorganic filler particles, a passivation layer (L2), at an anode side of the hybrid solid electrolyte (4), which facilitates the formation of a solid electrolyte interphase (SEI) and acts as a wetting or adhesion layer for the anode (2), and a ceramic interlayer (L3) forming an essentially closed coat between the passivation layer (L2) and the remainder of the hybrid solid electrolyte (4), wherein the inorganic filler particles comprise inorganic high-k dielectric particles (8) and solid state electrolyte particles (9).

13. The method according to claim 12 comprising impregnating the hybrid solid electrolyte (4) with a liquid composition comprising a metal salt (6).

14. The method according to claim 12, wherein a) the solid state electrolyte particles (9) and/or the high-k dielectric particles (8) are provided in an amount above a percolation threshold; or b) at least one or more of the inorganic high-k dielectric particles (8) and the solid state electrolyte particles (9) are formed by electrospinning a corresponding precursor composition thereto.

15. The method according to claim 12, wherein providing (103) the hybrid solid electrolyte (4) comprises:

dispensing (104), forming a dispensed layer comprising the solid state electrolyte particles (9) in a carrier further comprising the polymer matrix (5) and/or a precursor (5*p*) thereto, followed by solidifying (105) polymer matrix (5) and/or the precursor thereto.

16. The method according to claim 15, wherein the method comprises aligning (106) the solid state electrolyte fibers (9) in an electromagnetic field, said field being oriented perpendicularly to the dispensed layer.

17. The method according to claim 15, wherein the dispensed layer further comprises the dielectric particles (8).

18. The method according to claim 12, wherein dispensing comprises melt-casting and/or melt extrusion.

19. The method according to claim 12, wherein providing (103) the hybrid solid electrolyte (4) comprises:

generating a dry porous structure comprising fibers of one or more of the inorganic high-k dielectric particles (8) and the solid state electrolyte particles (9), and impregnating the dry porous structure with a composition comprising the polymer matrix and/or a precursor thereto, followed by solidifying polymer matrix and/or the precursor thereto.

20. The method according to claim 19, wherein generating the dry porous structure is formed in a process comprising ejecting, preferably electrospinning, a precursor to the solid state electrolyte particles and/or the high-k dielectric particles from a deposition nozzle onto a carrier, whereby a lateral displacement rate of the nozzle relative to the carrier is smaller than a deposition rate of the fiber from the nozzle.

* * * * *